(12) United States Patent
Ziemkiewicz et al.

(10) Patent No.: US 10,133,083 B1
(45) Date of Patent: Nov. 20, 2018

(54) HYBRID BEAMSTEERER FOR STEERING A LIGHT BEAM WITH BOTH SUB-APERTURE AND FULL-APERTURE BEAM STEERING PORTIONS

(71) Applicant: Analog Devices, Inc., Norwood, MA (US)

(72) Inventors: Michael Ziemkiewicz, Norwood, MA (US); Michael Howard Anderson, Lyons, CO (US); Scott Robert Davis, Denver, CO (US); Benjamin Luey, Denver, CO (US); Tyler Adam Dunn, North Reading, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/678,741

(22) Filed: Aug. 16, 2017

(51) Int. Cl.
| | | |
|---|---|---|
| *G02B 27/42* | (2006.01) | |
| *G02F 1/295* | (2006.01) | |
| *G02B 5/18* | (2006.01) | |
| *G02B 27/44* | (2006.01) | |

(52) U.S. Cl.
CPC ....... *G02B 27/4233* (2013.01); *G02B 5/1814* (2013.01); *G02B 27/44* (2013.01); *G02F 1/2955* (2013.01); *G02F 2203/24* (2013.01)

(58) Field of Classification Search
None
See application file for complete search history.

(56) References Cited

U.S. PATENT DOCUMENTS

| | | | | |
|---|---|---|---|---|
| 3,447,855 | A * | 6/1969 | Skinner | G02F 1/0128 359/316 |
| 3,458,247 | A * | 7/1969 | Buhrer | G02F 1/29 359/316 |
| 3,485,553 | A * | 12/1969 | Lee | G02F 1/29 359/302 |
| 3,510,199 | A * | 5/1970 | Lee | G02F 1/29 359/315 |
| 5,802,223 | A | 9/1998 | Nashimoto | |
| 5,920,662 | A | 7/1999 | Hinkov | |
| 6,400,855 | B1 | 6/2002 | Li et al. | |

(Continued)

OTHER PUBLICATIONS

"U.S. Appl. No. 15/479,999, Final Office Action dated Dec. 18, 2017", 12 pgs.

(Continued)

*Primary Examiner* — Andrew Jordan
(74) *Attorney, Agent, or Firm* — Schwegman Lundberg & Woessner, P.A.

(57) ABSTRACT

A non-mechanical beamsteerer can be provided to adjust an angle of a light beam, such as to scan the light beam over a field of regard. The non-mechanical beamsteerer can include a first collection of steering elements that are smaller than a size of a light beam. The first collection of steering elements can adjust the angle of the light beam by diffracting the light beam. The non-mechanical beamsteerer can also include a second collection of steering elements that are larger than a size of the light beam. The second collection of steering elements can adjust an angle of the light beam by refracting the light beam. The non-mechanical beamsteerer can operate without a compensation plate, such as to provide a reduced size of the beamsteerer and an increased acceptance angle of the beamsteerer.

23 Claims, 11 Drawing Sheets

(56) References Cited

U.S. PATENT DOCUMENTS

| | | | |
|---|---|---|---|
| 6,774,871 B2 | 8/2004 | Birdwell | |
| 6,985,373 B2* | 1/2006 | Tsu | G02F 1/292 257/2 |
| 7,027,670 B2 | 4/2006 | Aoki | |
| 7,146,070 B1* | 12/2006 | Li | G02F 1/1326 385/18 |
| 7,233,261 B2* | 6/2007 | Nunnally | G02F 1/295 341/13 |
| 7,720,116 B2 | 5/2010 | Anderson et al. | |
| 8,311,372 B2 | 11/2012 | Anderson et al. | |
| 8,380,025 B2 | 2/2013 | Anderson et al. | |
| 8,463,080 B1 | 6/2013 | Anderson et al. | |
| 8,860,897 B1 | 10/2014 | Anderson et al. | |
| 8,989,523 B2 | 3/2015 | Anderson et al. | |
| 9,033,888 B2* | 5/2015 | Brown | A61B 8/5269 600/447 |
| 9,366,938 B1 | 6/2016 | Anderson et al. | |
| 9,730,676 B2* | 8/2017 | Brown | A61B 8/5269 |
| 9,829,766 B2* | 11/2017 | Anderson | G02F 1/295 |
| 9,880,443 B2* | 1/2018 | Anderson | G02F 1/29 |
| 9,885,892 B2* | 2/2018 | Anderson | G02F 1/295 |
| 2002/0114556 A1 | 8/2002 | Kato | |
| 2003/0118262 A1 | 6/2003 | Aoki et al. | |
| 2004/0264229 A1* | 12/2004 | Tsu | G02F 1/292 365/113 |
| 2005/0123228 A1 | 6/2005 | Nishizawa et al. | |
| 2005/0271325 A1 | 12/2005 | Anderson et al. | |
| 2006/0072186 A1* | 4/2006 | Nunnally | G02F 1/295 359/315 |
| 2008/0008413 A1* | 1/2008 | Anderson | G02F 1/295 385/8 |
| 2008/0008414 A1* | 1/2008 | Anderson | G02F 1/295 385/8 |
| 2009/0015904 A1 | 1/2009 | Okayama | |
| 2012/0269478 A1* | 10/2012 | Anderson | G02F 1/295 385/3 |
| 2012/0296215 A1* | 11/2012 | Brown | A61B 8/5269 600/447 |
| 2013/0258452 A1 | 10/2013 | Kamiguchi et al. | |
| 2013/0259417 A1 | 10/2013 | Kamiguchi et al. | |
| 2015/0366542 A1* | 12/2015 | Brown | A61B 8/5269 600/447 |
| 2017/0038590 A1* | 2/2017 | Jepsen | G02B 27/0172 |
| 2017/0038591 A1* | 2/2017 | Jepsen | G02B 27/0172 |
| 2017/0039904 A1* | 2/2017 | Jepsen | G02B 27/0172 |
| 2017/0039906 A1* | 2/2017 | Jepsen | G02B 27/0172 |
| 2017/0039907 A1* | 2/2017 | Jepsen | G02B 27/0172 |
| 2017/0039960 A1* | 2/2017 | Jepsen | G02B 27/0172 |
| 2017/0059960 A1* | 3/2017 | Shi | G02F 1/13306 |
| 2017/0115519 A1* | 4/2017 | Shi | G02F 1/1393 |
| 2017/0153530 A1 | 6/2017 | Anderson et al. | |
| 2017/0192264 A1 | 7/2017 | Anderson et al. | |
| 2017/0212404 A1* | 7/2017 | Anderson | G02F 1/29 |

OTHER PUBLICATIONS

"U.S. Appl. No. 15/479,999, Non Final Office Action dated Aug. 28, 2017", 15 pgs.
"U.S. Appl. No. 15/479,999, Response filed Nov. 28, 2017 to Non Final Office Action dated Aug. 28, 2017", 13 pgs.
"U.S. Appl. No. 15/479,999, Response filed Jan. 5, 2018 to Final Office Action dated Dec. 18, 2017", 9 pgs.
"U.S. Appl. No. 15/479,999, Notice of Allowance dated Jan. 30, 2018", 12 pgs.
"U.S. Appl. No. 15/479,999, Amendment Under 37 CFR 1.312 Filed Apr. 27, 2018", 10 pgs.
"U.S. Appl. No. 15/479,999, PTO Response to Rule 312 Communication dated May 11, 2018", 3 pgs.
"U.S. Appl. No. 15/479,999, Notice of Allowance dated Jul. 20, 2018", 9 pgs.
"U.S. Appl. No. 15/479,999, Notice of Allowability dated May 31, 2018", 4 pgs.
"Move Your Light Not Your Mirrors: A New Analog, EO Beamsteerer With Unprecedented Performance", (Sep. 8, 2008), 2 pages.
"Vescent_New_SPIE_Newsroom", (Mar. 23, 2011), 4 pages.
"Vescent_SPIE_Newsroom", (Dec. 21, 2017), 5 pages.
Chao, Tien-Hsin, et al., "Compact liquid crystal waveguide based Fourier transform spectrometer for in-situ and remote gas and chemical sensing", Proc. of SPIE vol. 6977 69770P-10, (Mar. 17, 2008), 12 pages.
Chao, Tien-Hsin, et al., "Monolithic liquid crystal waveguide Fourier transform spectrometer for gas species sensing", Proc. of SPIE vol. 8055 805506-1, (Apr. 26, 2011), 14 pages.
Davis, S P, et al., "Fourier Transform Spectrometry", SPIE_LCWFTSnewsroom_final, (Jun. 19, 2008), 3 pages.
Davis, Scott R., et al., "A lightweight, rugged, solid state laser radar system enabled by nonmechanical electro-optic beam steerers", Proc. of SPIE vol. 9832 98320K-1, (May 13, 2016), 12 pages.
Davis, Scott R., et al., "A new electro-optic waveguide architecture and the unprecedented devices it enables", Proc. of SPIE vol. 6975 697503-1, (Mar. 24, 2008), 13 pages.
Davis, Scott R,, et al., "A new generation of previously unrealizable photonic devices as enabled by a unique electro-optic waveguide architecture", Proc. of SPIE vol. 7050 7050051, (Aug. 27, 2008), 16 pages.
Davis, Scott R., et al., "A new photonics technology platform and its applicability for coded aperture techniques", Proc. of SPIE vol. 8165 81651E-1, (Sep. 13, 2011), 10 pages.
Davis, Scott R., et al., "Analog, non-mechanical beamsteerer with 80 degree field of regard", Proc. of SPIE vol. 6971 69710G-1, (Mar. 24, 2008), 12 pages.
Davis, Scott R., et al., "Large-Angle Electro-Optic Laser Scanner", (Mar. 31, 2008), 2 pages.
Davis, Scott R., et al., "Liquid crystal clad waveguide laser scanner and waveguide amplifier for LADAR and sensing applications", Proc. of SPIE vol. 9365 93650N-1, (Feb. 27, 2015), 13 pages.
Davis, Scott R., et al., "Liquid Crystal Waveguides: New Devices Enabled by >1000 Waves of Optical Phase Control", SPIE 2010, (Jul. 1, 2010), 14 pages.
Davis, Scott R., et al., "New electro-optic laser scanners for small-sat to ground laser communication links", Proc. of SPIE vol. 8739 87390H-1, (May 21, 2013), 11 pages.
Davis, Scott R., et al., "New Wide Angle Electro-Optic Laser Scanners Enable Optical Sensors on Previously Inaccessible Platforms", AIWB Laser Applications, Imaging and Applied Optics: OSA Optics & Photonics Congress, Toronto CA, Jul. 10-14, 2011 (Jul. 10, 2011), 3 pages.
Davis, Scott R., et al., "Next-generation photonic true time delay devices as enabled by a new electro-optic architecture", Proc. of SPIE vol. 8739 87390G-1, (May 21, 2013), 16 pages.
Davis, Scott, "Vescent Power Handling", (Jun. 15, 2018), 2 pages.
Farca, George, et al., "An Analog, Non-Mechanical Beam-Steerer with an 80 Degree Field of Regard for LIDAR Applications", Vescent Photonics ILMF 2008 Presentation, (Jan. 30, 2008), 11 pages.
Frantz, Jesse A., et al., "Non-mechanical beam steering in the mid-wave infrared", Proc. of SPIE vol. 10181 101810X-1, (May 11, 2017), 8 pages.
Keller, Sean D., et al., "Emerging liquid crystal waveguide technology for low SWaP active short-wave infrared imagers", Proc. of SPIE vol. 9384 93840M-1 (Mar. 11, 2015), 10 pages.
Luey, Ben, et al,, "A Lightweight, Cost-Efficient, Solid-State Lidar System Utilizing Liquid Crystal Technology for Laser Beam Steering for Advanced Driver Assistance", (Apr. 1, 2017), 9 pages.
Ziemkiewicz, Michael, et al., "Laser-based satellite communication systems stabilized by nonmechanical electro-optic scanners", Proc. of SPIE vol. 9828 982808-1, (May 17, 2016), 13 pages.

* cited by examiner

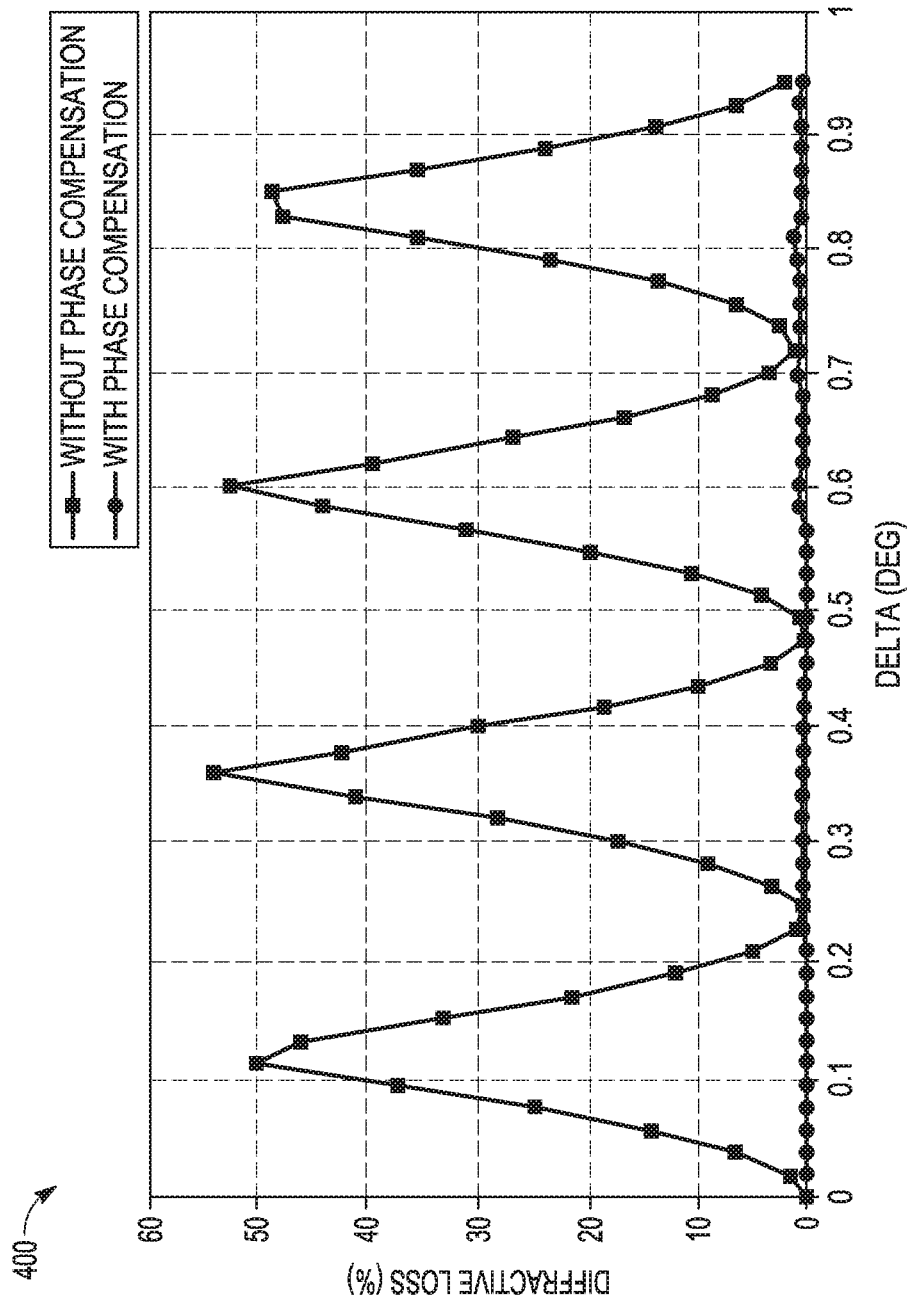

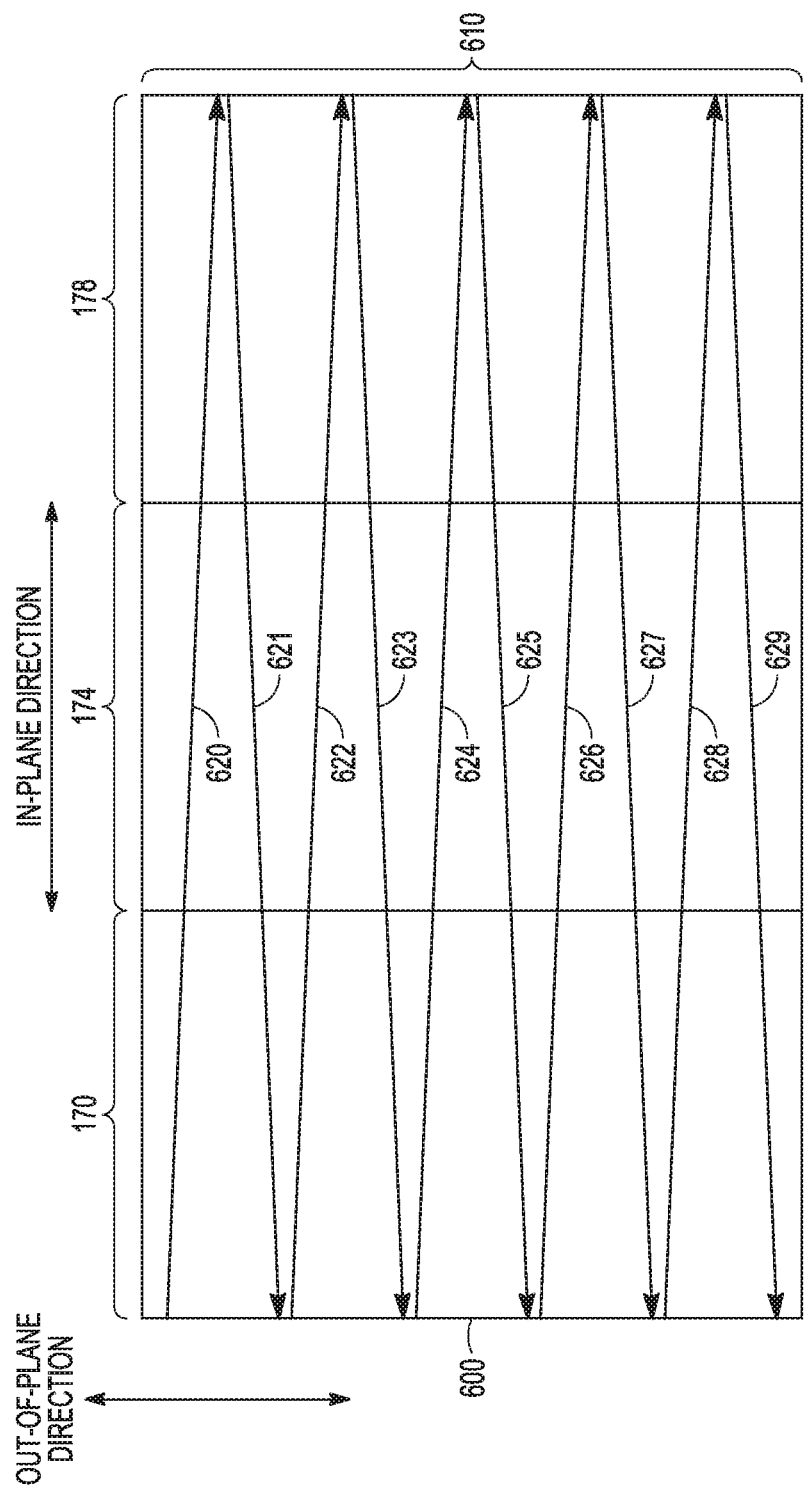

HYBRID BEAMSTEERER FOR STEERING A LIGHT BEAM WITH BOTH SUB-APERTURE AND FULL-APERTURE BEAM STEERING PORTIONS

FIELD OF THE DISCLOSURE

The present disclosure relates to systems and methods for steeling a light beam.

BACKGROUND

Certain non-mechanical beamsteerers can face challenges in dynamically adjusting an angle of a light beam.

SUMMARY OF THE DISCLOSURE

In certain beam steering systems, an array of sub-aperture refractive elements can be used to adjust an angle of a light beam with reduced diffractive effects. Diffractive effects can be reduced, such as by blazing each of the individual elements in the refractive array, and additionally, by using a compensation plate. The use of a compensation plate can lead to increased size of the beamsteerer and additionally, can limit an acceptance angle of the beamsteerer. The inventors have recognized, among other things, the need for a non-mechanical beamsteerer that can operate without a compensation plate, such as to provide a compact beamsteerer and an increased acceptance angle of the beamsteerer. Further features of the disclosure are provided in the appended claims, which features may optionally be combined with each other in any permutation or combination, unless expressly indicated otherwise elsewhere in this document.

In an aspect, the disclosure can feature a beamsteering apparatus for adjusting an angle of a light beam. The beamsteering apparatus can include a discrete beam steering portion. The discrete beam steering portion can include a collection of sub-aperture beam steeling elements, such as to diffract the light beam in an in-plane direction. The beamsteering apparatus can also include a continuous beam steering portion. The continuous beam steering portion can include a collection of full-aperture refractive beam steering elements, such as to continuously refract the light beam in an in-plane direction. The collection of sub-aperture beam steering elements can include a first collection of sub-aperture beam steering elements, such as to diffract the light beam in a first in-plane direction and a second collection of sub-aperture beam steering elements, such as to diffract the light beam in a second in-plane direction and the collection of full-aperture refractive beam steering elements can include a first collection of full-aperture refractive beam steering elements, such as to continuously refract the light beam in the first in-plane direction and a second collection of fill-aperture refractive beam steering elements, such as to continuously refract the light beam in the second in-plane direction. The first in-plane direction and the second in-plane direction can be angularly opposing with respect to a bisector. The first collection of sub-aperture beam steering elements can include a first row of sub-aperture beam steering elements, where an individual one of the sub-aperture beam steering elements in the first row of sub-aperture beam steering elements can have a pitch such that an angle of the sub-aperture portion of the light beam refracted by the individual one of the sub-aperture beam steering elements corresponds to an angle of a diffractive order of the first row of sub-aperture beam steering elements. The second collection of sub-aperture beam steering elements can include a first row of sub-aperture beam steering elements, where an individual one of the sub-aperture beam steering elements in the first row of sub-aperture beam steering elements can have a pitch such that an angle of the sub-aperture portion of the light beam refracted by the individual one of the sub-aperture beam steering elements corresponds to an angle of a diffractive order of the first row of sub-aperture beam steering elements. The first and second collection of sub-aperture beam steering elements can each include at least one row of isosceles triangles, where each individual isosceles triangle can be tilted such that a base of the isosceles triangle is approximately parallel to a direction of travel of a corresponding portion of the light beam, such as to reduce compression of the corresponding portion of the light beam. The first collection of sub-aperture beam steering elements can include a first row of sub-aperture refractive elements having slanted surfaces arranged, such as to provide diffractive beam steering and a reduction in a size of the light beam corresponding to each sub-aperture refractive element, and a second row of sub-aperture refractive elements having slanted surfaces that can be arranged relative to the slanted surfaces of the first row of sub-aperture refractive elements, such as to provide further beam steering and an increase in the size of the light beam corresponding to each sub-aperture element, such as to compensate for the decrease in beam size caused by the first row of sub-aperture refractive elements. The slanted surfaces can be slanted with respect to a direction of travel of the light beam. The beamsteering apparatus can also include a waveguide core shaped to guide the light beam along a length of a waveguide. The beamsteering apparatus can also include a cladding including an electro-optic material capable of an interaction with a portion of the light beam (e.g., the electro-optic material can provide a refractive index to the light beam). The beamsteering apparatus can also include at least one electrode shaped and arranged to adjust an angle of the light beam in an in-plane direction by adjusting an index of refraction of the electro-optic material. The beamsteering apparatus can also include an evanescent out-coupler, such as to steer the light beam in an out-of-plane direction.

In an aspect, the disclosure can feature a method of steering a light beam with a planar waveguide. The method can include providing a discrete beam steering portion of the waveguide, including a first collection of sub-aperture beam steering elements, such as to diffract the light beam in a first in-plane direction. The method can also include providing a continuous beam steering portion of the waveguide, including a first collection of sub-aperture beam steering elements, such as to refract the light beam in the first in-plane direction. The method can also include providing a discrete beam steering portion including a second collection of sub-aperture beam steering elements, such as to diffract the light beam in a second in-plane direction, and providing the continuous beam steering portion including a second collection of sub-aperture beam steering elements, such as to refract the light beam in the second in-plane direction, wherein the first in-plane direction and the second in-plane direction can be angularly opposing with respect to a bisector. The method can also include providing an individual sub-aperture beam steering element in a first row of the first collection of sub-aperture beam steering elements, such as to refract a corresponding sub-aperture portion of the light beam at an angle corresponding to an angle of a diffractive order of the first row of the first collection of sub-aperture beam steering elements. The method can also include providing a first electrode coupled to a first row of the first collection of sub-aperture beam steering elements, such as to diffract the light beam into one of a set of diffraction orders of the first row of the first collection of sub-aperture beam steering elements, such as by applying one of a set of discrete steering voltages to the first row of sub-aperture beam steering elements. The method can also include providing at least one row of tilted isosceles triangles in the first collection of sub-aperture beam steering elements, such as to diffract the light beam, where each individual isosceles triangle can be tilted such that a base of the isosceles triangle can be approximately parallel to a direction of travel of a corresponding portion of the light beam, such as to reduce compression of the corresponding portion of the light beam. The method can also include providing a first row in the first collection of sub-aperture refractive elements, such as to provide diffractive beam steering in the first direction and a reduction in a size of the light beam corresponding to each sub-aperture refractive element, and a second row in the first collection of sub-aperture refractive elements, such as to provide further beam steering in the first direction and an increase in the size of the light beam corresponding to each sub-aperture element, such as to compensate for the decrease in beam size caused by the first row of sub-aperture refractive elements. The method can also include providing a core of the waveguide to guide the light beam along a length of a waveguide. The method can also include providing an electro-optic cladding capable of interacting with a portion of the light beam. The method can also include providing at least one electrode shaped and arranged to adjust an angle of the light beam in an in-plane direction by adjusting an index of refraction of the electro-optic cladding.

In an aspect, the disclosure can feature a waveguide for adjusting an angle of a light beam. The waveguide can include a waveguide core shaped to guide a light beam along a length of the waveguide. The waveguide can also include a cladding including an electro-optic material capable of an interaction with a portion of the light beam. The waveguide can also include electrodes shaped and arranged to adjust an angle of the light beam in an in-plane direction, such as by adjusting an index of refraction of the electro-optic material. The electrode arrangement can include a discrete beam steering portion, The discrete beam steering portion can include a collection of sub-aperture beam steering elements, such as to diffract the light beam in an in-plane direction. The electrode arrangement can also include a continuous beam steering portion. The continuous beam steering portion can include a collection of full-aperture refractive beam steering elements, such as to continuously refract the light beam in an in-plane direction. The collection of sub-aperture beam steering elements can include a first row of sub-aperture beam steering elements, where an individual one of the sub-aperture beam steering elements in the first row of sub-aperture beam steering elements can have a pitch such that an angle of the sub-aperture portion of the light beam refracted by the individual one of the sub-aperture beam steering elements corresponds to an angle of a diffractive order of the first row of sub-aperture beam steering elements. The collection of sub-aperture beam steering elements can include a first row of sub-aperture beam steering elements capable of steering the light beam in a first in-plane direction, where an individual one of the sub-aperture beam steering elements in the first row of sub-aperture beam steering elements can have a pitch such that an angle of the sub-aperture portion of the light beam refracted by the individual one of the sub-aperture beam steering elements corresponds to an angle of a diffractive order of the first row of sub-aperture beam steering elements and where the collection of sub-aperture beam steering elements can include a second row of sub-aperture beam steering elements capable of steering the light beam in a second in-plane direction, an individual one of the sub-aperture beam steering elements in the second row of sub-aperture beam steering elements can have a pitch such that an angle of the sub-aperture portion of the light beam refracted by the individual one of the sub-aperture beam steering elements corresponds to an angle of a diffractive order of the second row of sub-aperture beam steering elements. The collection of sub-aperture beam steering elements can include a second row of sub-aperture beam steering elements capable of further steering the light beam in the first in-plane direction, where an individual one of the sub-aperture beam steering elements in the second row of sub-aperture beam steering elements can have a same pitch as the individual sub-aperture beam steering elements in the first row.

In an aspect, the disclosure can feature a method of steering a light beam with a planar waveguide. The method can include discretely diffracting sub-aperture portions of the light beam in a first in-plane direction. The method can also include continuously refracting the light beam in the first in-plane direction. The method can also include discretely diffracting sub-aperture portions of the light beam in a second in-plane direction, and continuously refracting the light beam in the second in-plane direction, wherein the first in-plane direction and the second in-plane direction are angularly opposing with respect to a bisector. The method can also include refracting a sub-aperture portion of the light beam corresponding to an individual sub-aperture refractive element at an angle corresponding to an angle of a diffractive order of a first row of a first collection of sub-aperture beam steering elements. The method can also include discretely diffracting the light beam into one of a set of diffraction orders of the first row of the first collection of sub-aperture beam steering elements, by applying one of a set of discrete steering voltages to the first row of sub-aperture beam steering elements. The method can also include diffracting the light beam using at least one row of tilted isosceles triangles in a first collection of sub-aperture beam steering elements, where each individual isosceles triangle is tilted such that a base of the isosceles triangle is approximately parallel to a direction of travel of a corresponding portion of the light beam to reduce compression of the corresponding portion of the light beam. The method can also include diffractively steering the light beam in the first in-plane direction and reducing a size of the light beam corresponding to each sub-aperture refractive element in a first row of sub-aperture refractive elements, and further diffractively steering the light beam in the first in-plane direction and increasing the size of the light beam corresponding to each of the plurality of sub-aperture refractive elements to compensate for the decrease in beam size caused by the first row of sub-aperture refractive elements. The method can also include guiding the light beam along a length of a waveguide, and adjusting an angle of the light beam in an in-plane direction by adjusting an index of refraction of an electro-optic cladding capable of interacting with a portion of the light beam.

BRIEF DESCRIPTION OF THE DRAWINGS

The present disclosure will now be described, by way of example, with reference the accompanying drawings, in which:

FIG. 4 illustrates simulated results of diffractive loss in hybrid beamsteerer.

FIG. 6A illustrates an example of operation of a non-mechanical beamsteerer.

DETAILED DESCRIPTION

Non-mechanical beamsteerers can adjust an angle of a light beam, such as to scan the light beam over a field of regard. Non-mechanical beamsteerers can be used in lidar systems, such as automotive lidar systems. An array of sub-aperture refractive elements can be used to adjust an angle of a light beam where diffractive effects can be reduced, such as by blazing each of the individual elements in the refractive array, and additionally, by using a compensation plate. However, the use of a compensation plate can lead to increased size of the beamsteerer and additionally, can limit an acceptance angle of the beamsteerer. Described below is a non-mechanical beamsteerer that can operate without a compensation plate, such as to provide a compact beamsteerer and an increased acceptance angle of the beamsteerer.

Figure 1:
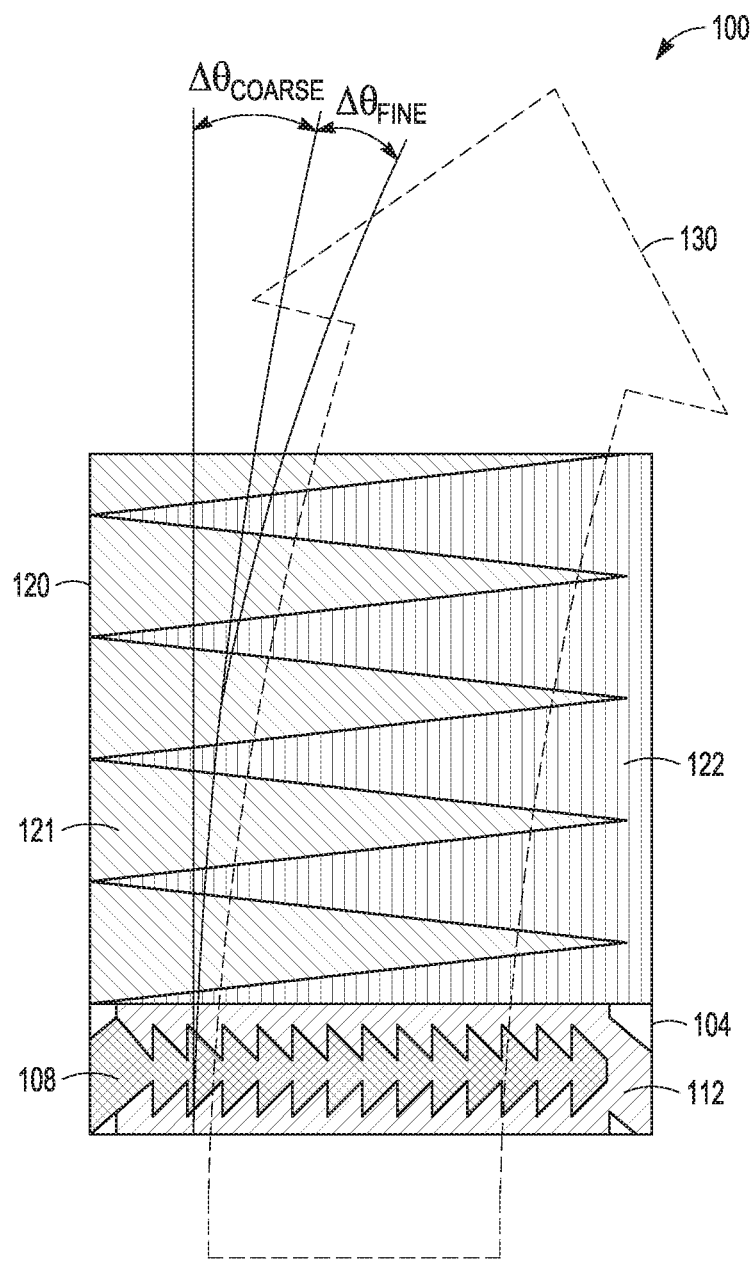
FIG. 1 illustrates an example of a hybrid beamsteerer.

FIG. 1 illustrates an example of a hybrid beamsteerer 100. The hybrid beamsteerer 100 can include a discrete beamsteering region 104 and a continuous beamsteering region 120. The discrete beamsteering region 104 can include a first arrangement of sub-aperture refractive elements 108 and a second arrangement of sub-aperture refractive elements 112. A sub-aperture refractive element can refer to a refractive element that is smaller than a size of a light beam (e.g., the light beam can span several of the sub-aperture refractive elements). The continuous beamsteering region 120 can include a first arrangement of full-aperture refractive elements 121 and a second arrangement of full-aperture refractive elements 122. A full-aperture refractive element can refer to a refractive element that is larger than a size of a light beam (e.g., the light beam has a size smaller than the full-aperture refractive element). During operation, a light beam 130 can be incident upon the discrete beamsteering region 104. The discrete beam steering region 104 can adjust an angle of the light beam 130 by a discrete angle $\pm\Delta\theta_{coarse}$ (e.g., plus or minus two degrees). The continuous beam steering region 120 can adjust an angle of the light beam 130 by a continuous angle ranging from $-\Delta\theta_{fine}$ to $+\Delta\theta_{fine}$ (e.g., an angle in the range of minus one degree to plus one degree). $\Delta\theta_{coarse}$ can be two times as large as $\Delta\theta_{fine}$. An applied voltage can be used to adjust an angle of the light beam 130 in the discrete beam steering region 104 and the continuous beam steering region 120.

Figure 2A:
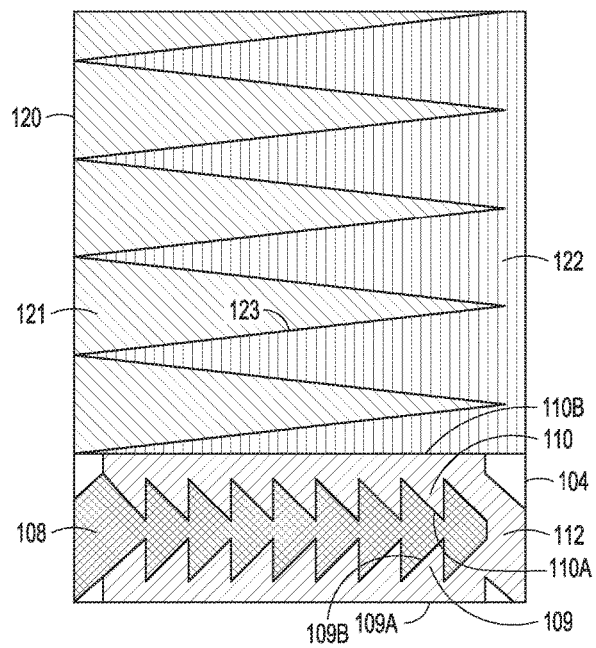
FIG. 2A illustrates an example of a hybrid beamsteerer.

FIG. 2A illustrates an example of a hybrid beamsteerer, such as the hybrid beamsteerer 100. The hybrid beamsteerer can include a discrete beamsteering region 104 and a continuous beamsteering region 120. The discrete beamsteering region 104 can include a first arrangement of sub-aperture refractive elements 108 and a second arrangement of sub-aperture refractive elements 112. An index of refraction of the first arrangement of sub-aperture refractive elements 108 can be different from an index of refraction of the second arrangement of the sub-aperture refractive elements 112. The continuous beamsteering region 120 can include a first arrangement of full-aperture refractive elements 121 and a second arrangement of full-aperture refractive elements 122. An index of refraction of the first arrangement of the full-aperture refractive elements 121 can be different from an index of refraction of the second arrangement of the full-aperture refractive elements 122. The first arrangement of sub-aperture refractive elements 108 can include a first row of sub-aperture refractive elements 109 and a second row of sub-aperture refractive elements 110. The first row of sub-aperture refractive elements 109 can include a first interface 109a and a second interface 109b. The second row of sub-aperture refractive elements 110 can include a first interface 110a and a second interface 110b. During operation, a light beam, such as the light beam 130, can be incident upon the first interface 109a and travel to the second interface 109b where the light beam can undergo refraction. In addition to being refracted at the second interface 109b, a size of the light beam can decrease upon being refracted at the second interface 109b, such as due to a relative angle of the second interface 109b relative to a direction of the light beam 130 In an example where the light beam 130 can extend over several of the sub-aperture refractive elements in the first row 109, a reduction in the size of each corresponding portion of the light beam can result in spatial amplitude variations in a wavefront of the light beam and can lead to increased diffraction of the light beam. The light beam 130 can travel towards, and be incident upon a first interface 110a after being refracted by the second interface 109b. The light beam can be refracted by the first interface 110a and then travel to the second interface 110b before exiting the second row of sub-aperture refractive elements 110. In addition to being refracted at the first interface 110a, a size of the light beam 130 can increase upon being refracted at the first interface 110a, such as due to a relative angle of the first interface 110a relative to a direction of the light beam 130, In an example where the light beam 130 can extend over several of the sub-aperture refractive elements in the second row 110, an increase in the size of each corresponding portion of the light beam can counteract corresponding decreases in the size of each corresponding portion of the light beam, such as that caused by the first row of sub-aperture refractive elements 109. Counteracting the decreases in the size of each corresponding portion of the light beam, such as that caused by the first row of sub-aperture refractive elements 109 can provide reduced amplitude variations in a wavefront of the light beam, such as to provide reduced diffractive effects. Adjacent portions of the first row of sub-aperture refractive elements 109 can induce spatial phase discontinuities in the light beam, such as can cause diffraction of the light beam. A pitch of the second interface 109b can be selected, such as to provide refraction of the light beam at an angle corresponding to a diffractive order of the first row of sub-aperture refractive elements 109. Adjacent portions of the second row of sub-aperture refractive elements 110 can induce spatial phase discontinuities in the light beam, such as can cause diffraction of the light beam. A pitch of the first interface 110a can be selected, such as to provide refraction of the light beam at an angle corresponding to a diffractive order of the second row of sub-aperture refractive elements 110. In an example, an index of refraction of the first arrangement of sub-aperture refractive elements 108 or the second arrangement of sub-aperture refractive elements 112 can be adjusted such as to provide refraction of the light beam 130 at an angle corresponding to a diffractive order of the first row of sub-aperture refractive elements 109 or the second row of sub-aperture refractive elements 110. After exiting the second interface 110b, the light beam, can be directed to the continuous beam steering region 120. In an example, a pitch of the second interface 109b can be selected, such as to provide refraction of the light beam at an angle not corresponding to a diffractive order of the first row of sub-aperture refractive elements 109. The light beam can then be directed to the first interface 110 and a pitch of the first interface 110a can be selected, such as to provide refraction of the light beam at an angle corresponding to a diffractive order of the second row of sub-aperture refractive elements 110. The light beam can then be refracted at each interface 123 between the first arrangement of full-aperture refractive elements 121 and the second arrangement of full-aperture refractive element 122. In an example, an index of refraction of the first arrangement of full-aperture refractive elements 121 or the second arrangement of full-aperture refractive elements 122 can be adjusted such as to adjust the refraction of the light beam 130 at each interface 123. In an example where an index of refraction of the first arrangement of sub-aperture refractive elements 108 is greater than an index of refraction of the second arrangement of the sub-aperture refractive elements 112, the discrete beamsteering region 104 can adjust an angle of the light beam 130 in a first direction. In an example where an index of refraction of the first arrangement of sub-aperture refractive elements 108 is less than an index of refraction of the second arrangement of the sub-aperture refractive elements 112, the discrete beamsteering region 104 can adjust an angle of the light beam 130 in a second direction. The first direction and the second direction can be angularly opposing with respect to a bisector. In an example where an index of refraction of the first arrangement of full-aperture refractive elements 121 is greater than an index of refraction of the second arrangement of the full-aperture refractive elements 122, the continuous beamsteering region 120 can adjust an angle of the light beam 130 in a first direction. In an example where an index of refraction of the first arrangement of full-aperture refractive elements 121 is less than an index of refraction of the second arrangement of the full-aperture refractive elements 122, the continuous beamsteering region 120 can adjust an angle of the light beam 130 in a second direction. The first direction and the second direction can be angularly opposing with respect to a bisector.

Figure 2B:
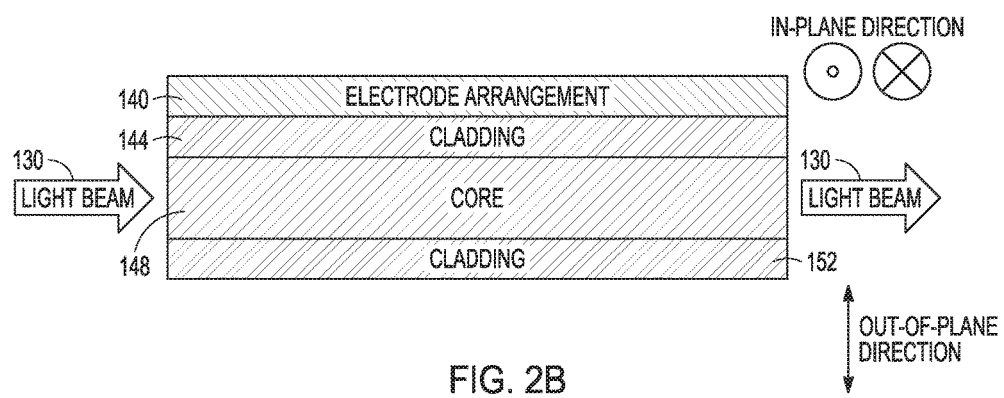
FIG. 2B illustrates an example of a cross-sectional view of a hybrid beamsteerer.

FIG. 2B illustrates a cross-sectional view of a hybrid beamsteerer, such as hybrid beamsteerer 100. The hybrid beamsteerer 100 can include an arrangement of electrodes 140, a first cladding 144, a waveguide core 148, and a second cladding 152. During operation, the light beam 130 can be guided through the waveguide core 148. The electrode arrangement 140 can include a pattern, such as a pattern corresponding to the refractive arrangements 108, 112, 121, and 122 as illustrated in FIG. 2A. In response to applied voltages to the electrode arrangement 140, a pattern of refractive shapes can be formed in the first cladding 144, the pattern of refractive shapes being the same as the shape of the electrode arrangement 140. The electrode arrangement 140 can include one or more electrodes, where each of the one or more electrodes can correspond to one of the refractive arrangements 108, 112, 121, and 122. The refractive shapes formed in the first cladding 144 can adjust an in-plane angle of the light beam guided through the waveguide core 148 as described above with respect to FIG. 2A. In an example the first cladding 144 can include a liquid crystal material and applied voltages to the electrode arrangement 140 can provide a change in the refractive index of the liquid crystal material, such as to provide refractive shapes in the first cladding 144 that correspond to a shape of the electrode arrangement 140. The waveguide core 148 or the second cladding 152 can be electrically conductive, such as to provide uniform electric field lines in a region of the first cladding 144 (e.g., electrical field lines similar to the electrical field lines in a parallel plate capacitor).

Figure 2C:
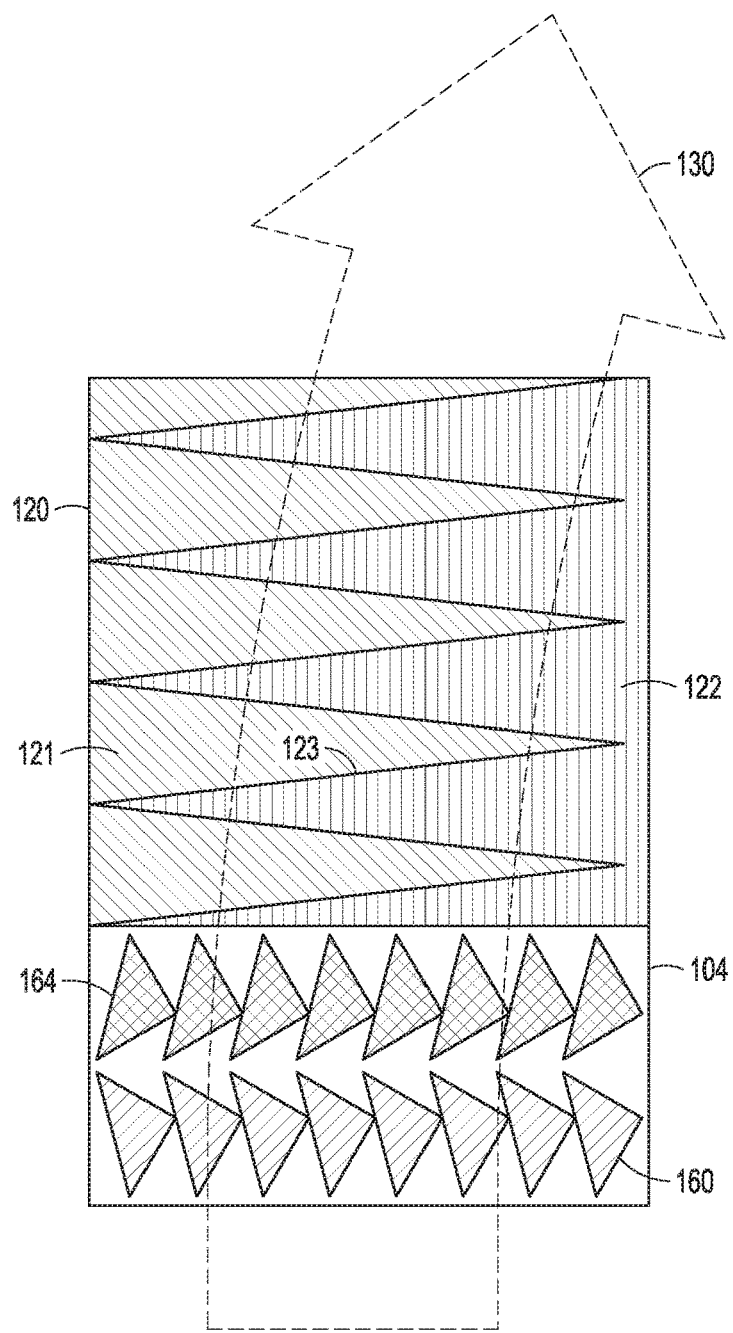
FIG. 2C illustrates an example of a hybrid beamsteerer.

FIG. 2C illustrates an example of a hybrid beamsteerer where the discrete beamsteering region 104 can include a first row of sub-aperture isosceles shaped refractive elements 160 and a second row of sub-aperture isosceles shaped refractive elements 164. During operation, a light beam, such as the light beam 130, can be refracted in a first direction by the first row of sub-aperture isosceles shaped refractive elements 160 and can be refracted in a second direction by the second row of sub-aperture isosceles shaped refractive elements 164. Each individual refractive element in the first row of sub-aperture isosceles shaped refractive elements 160 and the second row of sub-aperture isosceles shaped refractive elements 164 can include a base tilted approximately parallel to a direction of travel of the light beam 130, such as to reduce compression of a corresponding portion of the light beam 130.

Figure 2D:
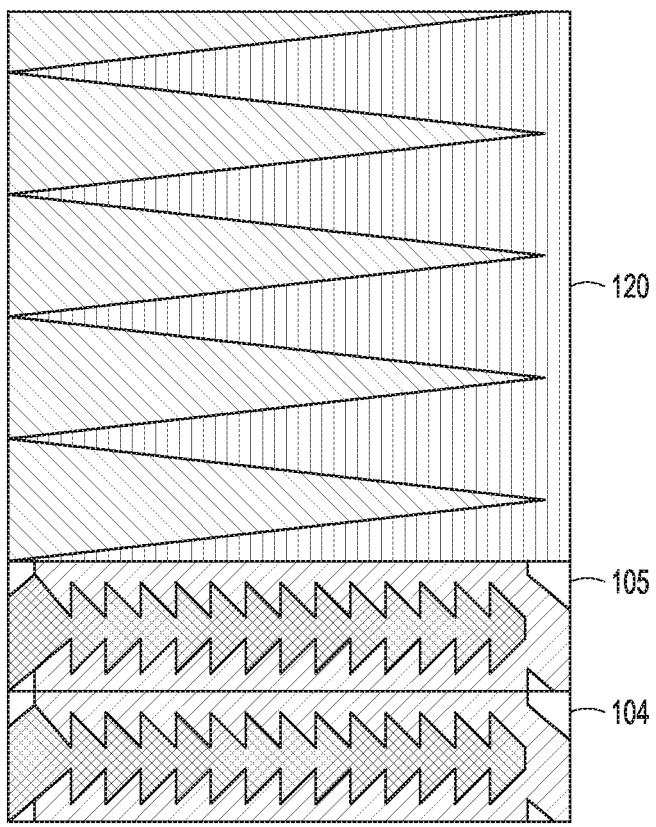
FIG. 2D illustrates an example of a hybrid beamsteerer.

FIG. 2D illustrates an example of a hybrid beamsteerer that can include an additional discrete beamsteering region 105. Each of the discrete beam steering regions 104, 105 can individually adjust an angle of the light beam 130 by a discrete angle $\pm\Delta\theta_{coarse}$. In combination, the discrete beam steering regions 104 and 105 can adjust an angle of the light beam 130 by a discrete angle $\pm 2\Delta\theta_{coarse}$, $\pm\Delta\theta_{coarse}$, or 0.

Figure 3A:
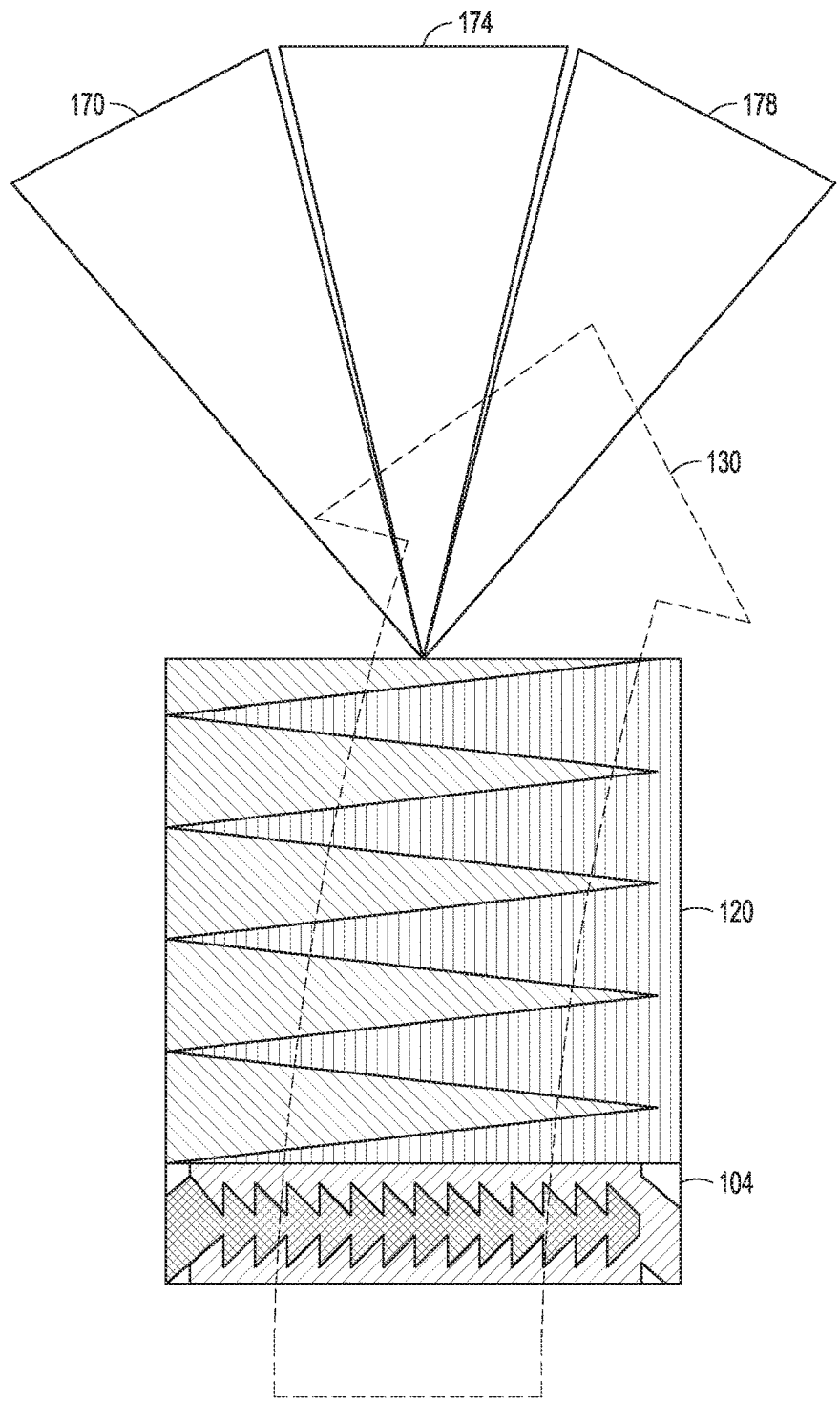
FIG. 3A illustrates an example of operation of a hybrid beamsteerer.

FIG. 3A illustrates an example of operation of a hybrid beamsteerer, such as the hybrid beamsteerer 100. The discrete beamsteering region 104 can adjust an angle of the light beam 130 by a discrete angle $\pm\Delta\theta_{coarse}$. The continuous beamsteering region 120 can adjust an angle of the light beam 130 by a continuous angle ranging from—$\Delta\theta_{fine}$, to +$\Delta\theta_{fine}$. In combination, the discrete beamsteering region 104 and the continuous beamsteering region 108 can adjust an angle of a light beam over three ranges of angles 170, 174, 178. For a first range of angles 170, one or more voltages can be applied to electrodes in the discrete beamsteering region 104 to adjust an angle of the light beam by a discrete angle $-\Delta\theta_{coarse}$, and one or more variable voltages can be applied to electrodes in the continuous beamsteering region 120 to adjust an angle of the light beam by a continuous angle ranging from $-\Delta\theta_{fine}$ to $+\Delta\theta_{fine}$. Thus, in the first range of angles 170, an angle of the light beam can be adjusted in a range from $-\Delta\theta_{coarse} -\Delta\theta_{fine}$ to $-\Delta\theta_{fine} +\Delta\theta_{fine}$. For a second range of angles 174, one or more voltages having a value of approximately zero can be applied to electrodes in the discrete beamsteering region 104 and an angle of the light beam can be unchanged by the discrete beamsteering region 104. One or more variable voltages can be applied to electrodes in the continuous beamsteering region 120 to adjust an angle of the light beam by a continuous angle ranging from $-\Delta\theta_{fine}$ to $+\Delta\theta_{fine}$. Thus, in the second range of angles 174, an angle of the light beam can adjusted in a range from $-\Delta\theta_{fine}$ to $+\Delta\theta_{fine}$. For a third range of angles 178, one or more voltages can be applied to electrodes in the discrete beamsteering region 104 to adjust an angle of the light beam by a discrete angle $+\Delta\theta_{coarse}$, and one or more variable voltages can be applied to electrodes in the continuous beamsteering region 120 to adjust an angle of the light beam by a continuous angle ranging from $-\Delta\theta_{fine}$ to $+\Delta\theta_{fine}$. Thus, in the third range of angles 178, an angle of the light beam can adjusted in a range from $+\Delta\theta_{coarse} -\Delta\theta_{fine}$ to $+\Delta\theta_{coarse} +\Delta\theta_{fine}$.

Figure 3B:
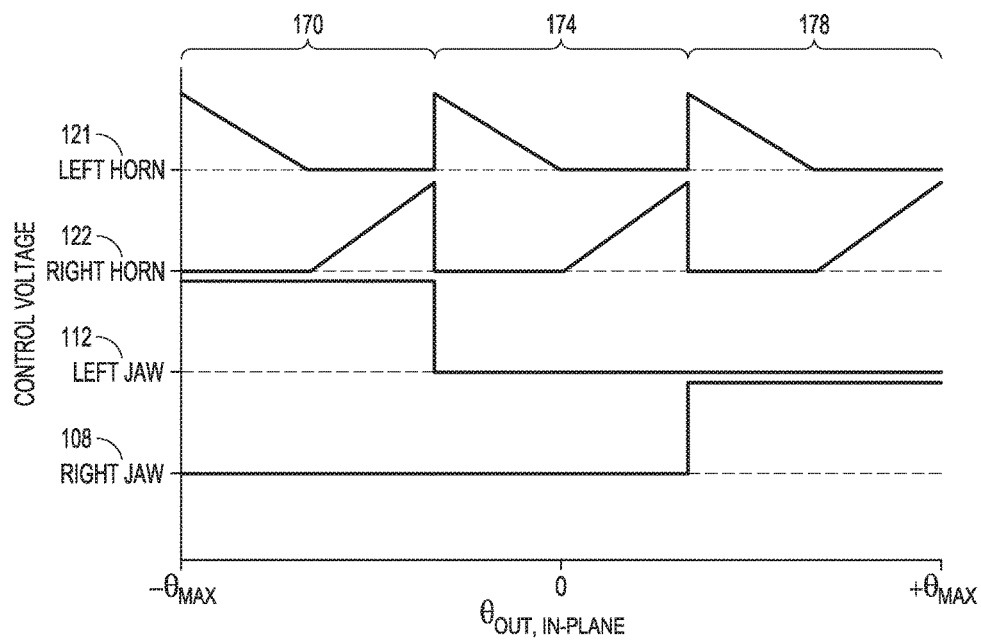
FIG. 3B illustrates an example of operation of a hybrid beamsteerer.

FIG. 3B illustrates a method of operation of a hybrid beamsteerer, such as the hybrid beamsteerer 100. The hybrid beamsteerer can adjust an in-plane angle of a light beam over a range of angles from $-\Delta\theta_{max}$ to $+\Delta\theta_{max}$, where $\Delta\theta_{max}$ can correspond to $\Delta\theta_{coarse}+\Delta\theta_{fine}$. For a first range of angles 170 a voltage can be applied to an electrode to adjust an index of refraction of the second arrangement of sub-aperture refractive elements 112, such as to adjust an angle of the light beam by an angle $-\Delta\theta_{coarse}$. Additionally, a voltage can be applied to an electrode to adjust an index of refraction of the first arrangement of full-aperture refractive elements 121 and second arrangement of full-aperture refractive elements 122, such as to adjust an angle of the light beam over a range of angles from $-\Delta\theta_{fine}$ to $+\Delta\theta_{fine}$. Thus, by applying voltages to corresponding electrodes to adjust an index of refraction of the refractive elements 112, 121, and 122, an angle of the light beam can be adjusted within a first range of angles 170. For a second range of angles 174 the first and second arrangements of sub-aperture refractive elements 108 and 112 can be inactive (e.g., a voltage having a value of approximately zero may be applied to electrodes corresponding to refractive elements 108 and 112). A voltage can be applied to an electrode to sequentially adjust an index of refraction of the first arrangement of full-aperture refractive elements 121 and second arrangement of full-aperture refractive elements 122, such as to adjust an angle of the light beam over a range of angles from $-\Delta\theta_{fine}$ to $+\Delta\theta_{fine}$. Thus, by applying voltages to corresponding electrodes to adjust an index of refraction of the refractive elements 121, and 122, an angle of the light beam can be adjusted within a second range of angles 174. For a third range of angles 178 a voltage can be applied to an electrode to adjust an index of refraction of the first arrangement of sub-aperture refractive elements 108, such as to adjust an angle of the light beam by an angle $+\Delta\theta_{coarse}$. Additionally, a voltage can be applied to an electrode to sequentially adjust an index of refraction of the first arrangement of full-aperture refractive elements 121 and second arrangement of full-aperture refractive elements 122, such as to adjust an angle of the light beam over a range of angles from $-\Delta\theta_{fine}$ to $+\Delta\theta_{fine}$. Thus, by applying voltages to corresponding electrodes to adjust an index of refraction of the refractive elements 108, 121, and 122, an angle of the light beam can be adjusted within a third range of angles 178.

Figure 3C:
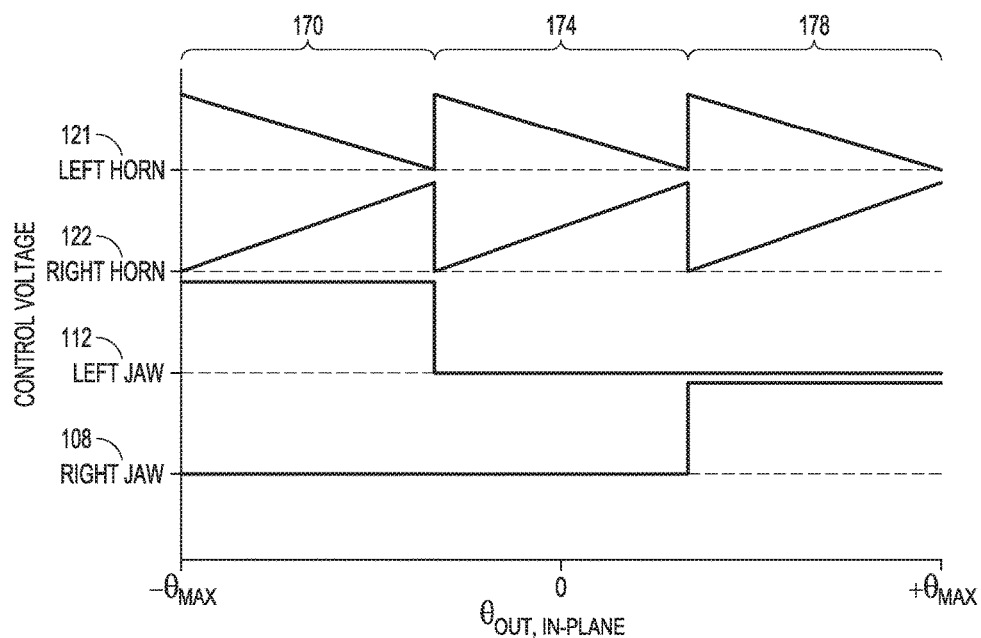
FIG. 3C illustrates an example of operation of a hybrid beamsteerer.

FIG. 3C illustrates a method of operation of a hybrid beamsteerer, such as the hybrid beamsteerer 100. The method of operation illustrated in FIG. 3C is similar to the method of operation described with respect to FIG. 3B, except that in FIG. 3C, voltages can be applied to corresponding electrodes to simultaneously adjust an index of refraction of the first arrangement of full-aperture refractive elements 121 and the second arrangement of full-aperture refractive elements 122. This is in contrast to the method of operation illustrated in FIG. 3B where the indices of refraction of the first arrangement of full-aperture refractive elements 121 and the second arrangement of full-aperture refractive elements 122 are adjusted sequentially.

FIG. 4 illustrates simulated results of diffractive loss (e.g., diffractive scattering out of a central light beam) as a function of an applied voltage that can adjust an index of refraction of one of the rows of sub-aperture refractive elements 109 or 110. As the applied voltage is increased, a diffractive loss can be reduced when an angle of refraction of an individual one of the sub-aperture refractive elements corresponds to a diffraction order of the row of sub-aperture refractive elements. In the example, illustrated in FIG. 4, the row of sub-aperture refractive elements can include a fourth order diffraction grating and diffractive losses can be reduced when an angle of refraction of an individual one of the sub-aperture refractive elements corresponds to one of the four diffraction orders. The fourth diffraction order can correspond to a maximum steering voltage (e.g., the largest allowable voltage that can be applied to adjust an index of refraction of the row of sub-aperture refractive elements). In an example where the row of sub-aperture refractive elements can include an $n^{th}$ order diffraction grating, the maximum steering voltage can correspond to the $n^{th}$ diffraction order and the row of sub-aperture refractive elements can steer the beam with reduced diffractive loss at n discrete angles, where n can be a positive integer.

Figure 5:
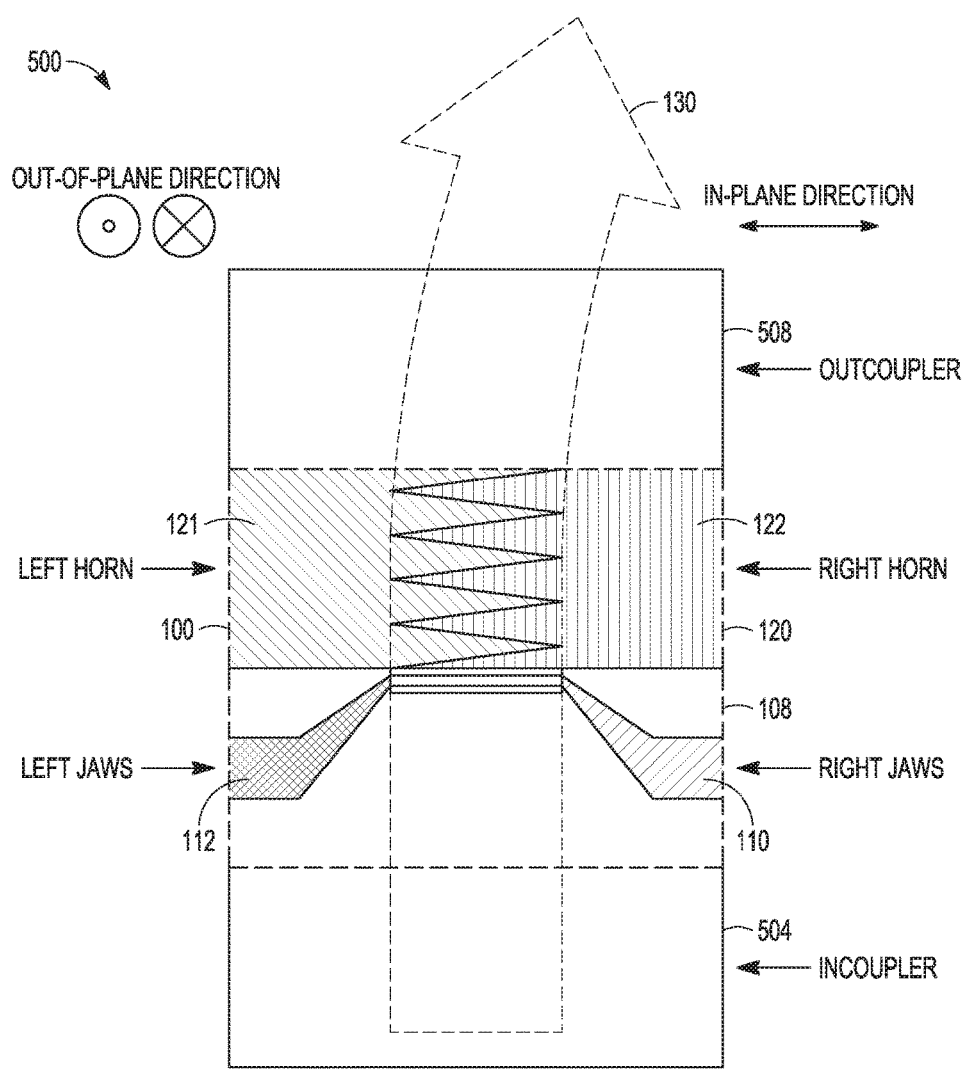
FIG. 5 illustrates an example of a non-mechanical beamsteerer

FIG. 5 illustrates an example of a non-mechanical beamsteerer 500. The non-mechanical beamsteerer can include an incoupler 504, a hybrid beamsteerer 100, and an outcoupler 508. During operation, a light beam 130 can be coupled into the non-mechanical beamsteerer 500 by the incoupler 504. The incoupler 504 can include an evanescent incoupler or a diffractive incoupler. The light beam 130 can then be directed to the hybrid beamsteerer 100. The hybrid beamsteerer can adjust an in-plane angle of the light beam 130. The light beam 130 can then be coupled out of the hybrid beamsteerer 100 by the outcoupler 508. The outcoupler 508 can include a diffractive outcoupler or an evanescent outcoupler such as the evanescent outcoupler described in U.S. Patent Publication No. US 2017/0153530 A1 by Anderson et al., the entirety of which is hereby incorporated by reference. In an example, the outcoupler 508 can adjust an angle of the light beam 120 in an out-of-plane direction.

FIG. 6A illustrates an example of operation of a non-mechanical beamsteerer, such as the non-mechanical beamsteerer 500. The non-mechanical beamsteerer can dynamically adjust an angle of a light beam, such as to scan the light beam 130 across a two-dimensional field of regard 600. The outcoupler 508 can adjust an angle of the light beam in an out-of-plane direction, such as in response to an applied voltage, and the hybrid beamsteerer 100 can adjust an angle of the light beam in an in-plane direction, such as in response to an applied voltage. The hybrid beamsteerer 100 can adjust an angle of the light beam continuously over the three ranges of angles 170, 174, and 178, as illustrated by path 620. An out-of-plane angle of the light beam can then be adjusted by the outcoupler 508. The hybrid beamsteerer 100 can adjust an angle of the light beam continuously over the three ranges of angles 170, 174, and 178, as illustrated by path 621. Scanning can continue along paths 622-628 and the outcoupler 508 and the hybrid beamsteerer 100 can scan the light beam across the two-dimensional field of regard 600, including angles in the ranges of angles 170, 174, 178, and 610. At each boundary between the ranges of angles 170, 174, and 178, a voltage applied to a discrete beamsteering region within the hybrid beamsteerer 100 can be adjusted.

Figure 6B:
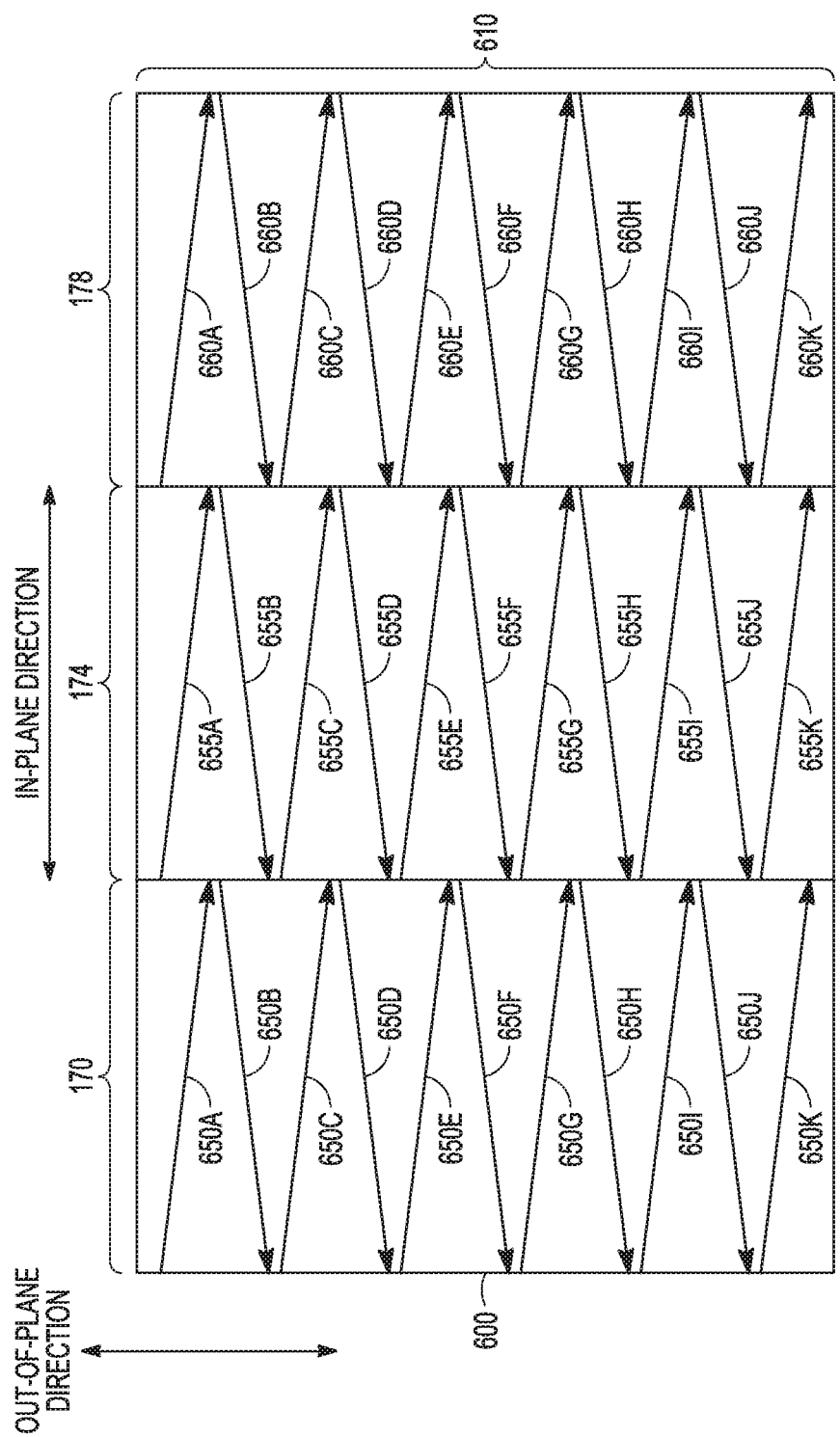
FIG. 6B illustrates an example of operation of a non-mechanical beamsteerer.

FIG. 6B illustrates an example of operation of a non-mechanical beamsteerer, such as the non-mechanical beamsteerer 500. Similar to FIG. 6A, the non-mechanical beamsteerer can dynamically adjust an angle of a light beam, such as to scan the light beam across a two-dimensional field of regard 600. The outcoupler 508 can adjust an angle of the light beam in an out-of-plane direction, such as in response to an applied voltage, and the hybrid beamsteerer 100 can adjust an angle of the light beam in an in-plane direction, such as in response to an applied voltage. In the example illustrated in FIG. 6B, a number of voltage changes applied to a discrete beamsteering region, such as the discrete beamsteering region 108, during the scanning of the light beam can be reduced. Such a reduction in a number of voltage changes applied to the discrete beamsteering region can be advantageous when the discrete beamsteering region is slower to respond to voltage changes than other portions of the non-mechanical beamsteerer 500. The hybrid beamsteerer 100 can adjust an angle of the light beam continuously over the first range of angles 170 as illustrated by path 650a. An out-of-plane angle of the light beam can then be adjusted by the outcoupler 508. The hybrid beamsteerer 100 can then adjust an angle of the light beam continuously over the first range of angles 170 as illustrated by path 650b. Scanning can continue along the paths 650c-650k and the outcoupler 508 and the hybrid beamsteerer 108 can scan the light beam over angles in the ranges of angles 170 and 610. Then, a voltage applied to the discrete beamsteering region 108 can be changed, and the hybrid beamsteerer 108 and the outcoupler 508 can scan the light beam along the paths 655a-655k and the outcoupler 508 and the hybrid beamsteerer 108 can scan the light beam over angles in the ranges of angles 174 and 610. Then, a voltage applied to the discrete beamsteering region 108 can be changed, and the hybrid beamsteerer 108 and the outcoupler 508 can scan the light beam along the paths 660a-660k and the outcoupler 508 and the hybrid beamsteerer 108 can scan the light beam over angles in the ranges of angles 178 and 610.

Figure 7:
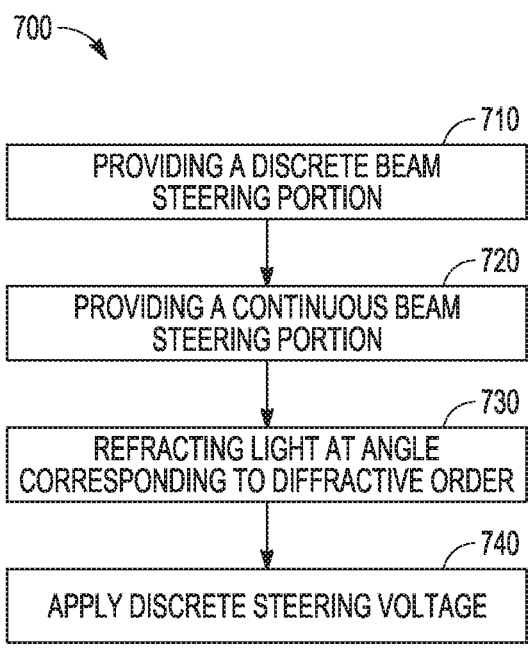
FIG. 7 illustrates a method of steering a light beam with a non-mechanical beamsteerer.

FIG. 7 illustrates a method of steering a light beam with a non-mechanical beamsteerer, such as a planar waveguide. A discrete beamsteering portion of a waveguide, such as the discrete beamsteering region 104 can be provided (step 710). The discrete beamsteering portion of the waveguide can include a first collection of sub-aperture beam steering elements, such as the first arrangement of sub-aperture refractive elements 108. The first collection of sub-aperture beam steering elements can diffract the light beam in a first in-plane direction. A continuous beamsteering portion of a waveguide, such as the continuous beamsteering region 120 can be provided (step 720). The continuous beamsteering portion of the waveguide can include a first collection of sub-aperture beam steering elements, such as the first arrangement of full-aperture refractive elements 121 and the second arrangement of full-aperture refractive elements 122. The first arrangement of full-aperture refractive elements 121 can refract the light beam in the first in-plane direction. The discrete beamsteering portion of the waveguide can include a second collection of sub-aperture beam steering elements, such as the second arrangement of sub-aperture refractive elements 112. The second collection of sub-aperture beam steering elements can diffract the light beam in a second in-plane direction. The continuous beam steering portion can include a second collection of sub-aperture beam steering elements, such as the second arrangement of full-aperture refractive elements 122. The second arrangement of full-aperture refractive elements 122 can refract the light beam in the second in-plane direction. The first in-plane direction and the second in-plane direction can be angularly opposing with respect to a bisector. The first collection of sub-aperture beam steering elements can include a first row of sub-aperture beam steering elements that can refract a corresponding sub-aperture portion of the light beam at an angle corresponding to an angle of a diffractive order of the first row of the first collection of sub-aperture beam steering elements (step 730). A first electrode coupled to a first row of the first collection of sub-aperture beam steering elements can be provided, such as to diffract the light beam into one of a set of diffraction orders of the first row of the first collection of sub-aperture beam steering elements, such as by applying one of a set of discrete steering voltages to the first row of sub-aperture beam steering elements (step 740).

Each of the non-limiting aspects described herein can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls, In this document, the terms "a" or "an" are used, as is common in patent documents, to include one or more than one, independent of any other instances or usages of "at least one" or "one or more," in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A beamsteering apparatus for adjusting an angle of a light beam, the beamsteering apparatus comprising:
   a first beam steering portion comprising:
      a collection of sub-aperture beam steering elements to diffract the light beam in an in-plane direction; and
   a second beam steering portion comprising:
      a collection of full-aperture refractive beam steering elements to refract the light beam in an in-plane direction.

2. The beamsteering apparatus of claim 1, wherein the collection of sub-aperture beam steering elements comprises a first collection of sub-aperture beam steering elements to diffract the light beam in a first in-plane direction and a second collection of sub-aperture beam steering elements to diffract the light beam in a second in-plane direction; and
   wherein the collection of full-aperture refractive beam steering elements comprises a first collection of full-aperture refractive beam steering elements to refract the light beam in the first in-plane direction and a second collection of full-aperture refractive beam steering elements to refract the light beam in the second in-plane direction.

3. The beamsteering apparatus of claim 2, wherein the first in-plane direction and the second in-plane direction are angularly opposing with respect to a bisector.

4. The beamsteering apparatus of claim 2, wherein the first collection of sub-aperture beam steering elements includes a first row of sub-aperture beam steering elements, an individual one of the sub-aperture beam steering elements in the first row of sub-aperture beam steering elements having a pitch such that an angle of the sub-aperture portion of the light beam refracted by the individual one of the sub-aperture beam steering elements corresponds to an angle of a diffractive order of the first row of sub-aperture beam steering elements.

5. The beamsteering apparatus of claim 4, wherein the second collection of sub-aperture beam steering elements includes a first row of sub-aperture beam steering elements, an individual one of the sub-aperture beam steering elements in the first row of sub-aperture beam steering elements having a pitch such that an angle of the sub-aperture portion of the light beam refracted by the individual one of the sub-aperture beam steering elements corresponds to an angle of a diffractive order of the first row of sub-aperture beam steering elements.

6. The beamsteering apparatus of claim 2, wherein the first and second collection of sub-aperture beam steering elements each include at least one row of isosceles triangles, where each individual isosceles triangle is tilted such that a base of the isosceles triangle is approximately parallel to a direction of travel of a corresponding portion of the light beam to reduce compression of the corresponding portion of the light beam.

7. The beamsteering apparatus of claim 2, wherein the first collection of sub-aperture beam steering elements includes a first row of sub-aperture refractive elements having slanted surfaces arranged to provide diffractive beam steering and a reduction in a size of the light beam corresponding to each sub-aperture refractive element, and a second row of sub-aperture refractive elements having slanted surfaces arranged relative to the slanted surfaces of the first row of sub-aperture refractive elements to provide further beam steering and an increase in the size of the light beam corresponding to each sub-aperture element to compensate for the decrease in beam size caused by the first row of sub-aperture refractive elements.

8. The beamsteering apparatus of claim 2, comprising:
   a waveguide core shaped to guide the light beam along a length of a waveguide; and
   a cladding including an electro-optic material capable of an interaction with a portion of the light beam;
   wherein at least one of the first or second beam steering portions comprises at least one electrode shaped and arranged to adjust an angle of the light beam in an in-plane direction by adjusting an index of refraction of the electro-optic material.

9. The beamsteering apparatus of claim 8, comprising an evanescent out-coupler to steer the light beam in an out-of-plane direction.

10. The beamsteering apparatus of claim 1, wherein the first beam steering portion provides discrete adjustment of the angle of the light beam in increments that are more coarse than an angular steering resolution provided by the second beam steering portion.

11. A method of steering a light beam with a planar waveguide, the method comprising:
   discretely diffracting sub-aperture portions of the light beam in a first in-plane direction using a first beam steering portion; and
   refracting the light beam in the first in-plane direction using a second beam steering portion.

12. The method of claim 11, comprising diffracting sub-aperture portions of the light beam in a second in-plane direction, and refracting the light beam in the second in-plane direction, wherein the first in-plane direction and the second in-plane direction are angularly opposing with respect to a bisector.

13. The method of claim 11, comprising refracting a sub-aperture portion of the light beam corresponding to an individual sub-aperture refractive element at an angle corresponding to an angle of a diffractive order of a first row of a first collection of sub-aperture beam steering elements.

14. The method of claim 13, comprising diffracting the light beam into one of a set of diffraction orders of the first row of the first collection of sub-aperture beam steering elements, by applying one of a set of discrete steering voltages to the first row of sub-aperture beam steering elements.

15. The method of claim 11, comprising diffracting the light beam using at least one row of tilted isosceles triangles in a first collection of sub-aperture beam steering elements, where each individual isosceles triangle is tilted such that a base of the isosceles triangle is approximately parallel to a direction of travel of a corresponding portion of the light beam to reduce compression of the corresponding portion of the light beam.

16. The method of claim 11, comprising diffractively steering the light beam in the first in-plane direction and reducing a size of the light beam corresponding to each sub-aperture refractive element in a first row of sub-aperture refractive elements, and further diffractively steering the light beam in the first in-plane direction and increasing the size of the light beam corresponding to each of the plurality of sub-aperture refractive elements to compensate for the decrease in beam size caused by the first row of sub-aperture refractive elements.

17. The method of claim 11, comprising:
guiding the light beam along a length of a waveguide; and
adjusting an angle of the light beam in an in-plane direction by adjusting an index of refraction of an electro-optic cladding interacting with a portion of the light beam.

18. The method of claim 11, wherein the first beam steering portion provides discrete adjustment of the angle of the light beam in increments that are more coarse than an angular steering resolution provided by the second beam steering portion.

19. A waveguide for adjusting an angle of a light beam, the waveguide comprising:
a waveguide core shaped to guide a light beam along a length of the waveguide;
a cladding including an electro-optic material capable of an interaction with a portion of the light beam;
electrodes shaped and arranged to adjust an angle of the light beam in an in-plane direction by adjusting an index of refraction of the electro-optic material;
wherein the arrangement of electrodes includes:
a first beam steering portion comprising:
a collection of sub-aperture beam steering elements to diffract the light beam in an in-plane direction; and
a second beam steering portion comprising:
a collection of full-aperture refractive beam steering elements to refract the light beam in an in-plane direction.

20. The waveguide of claim 19, wherein the collection of sub-aperture beam steering elements includes a first row of sub-aperture beam steering elements, an individual one of the sub-aperture beam steering elements in the first row of sub-aperture beam steering elements having a pitch such that an angle of the sub-aperture portion of the light beam refracted by the individual one of the sub-aperture beam steering elements corresponds to an angle of a diffractive order of the first row of sub-aperture beam steering elements.

21. The waveguide of claim 20 wherein the collection of sub-aperture beam steering elements includes a second row of sub-aperture beam steering elements configured to further steer the light beam in the first in-plane direction, an individual one of the sub-aperture beam steering elements in the second row of sub-aperture beam steering elements having a same pitch as the individual sub-aperture beam steering elements in the first row.

22. The waveguide of claim 19, wherein the collection of sub-aperture beam steering elements includes a first row of sub-aperture beam steering elements configured to steer the light beam in a first in-plane direction, an individual one of the sub-aperture beam steering elements in the second row of sub-aperture beam steering elements having a pitch such that an angle of the sub-aperture portion of the light beam refracted by the individual one of the sub-aperture beam steering elements corresponds to an angle of a diffractive order of the first row of sub-aperture beam steering elements; and
wherein the collection of sub-aperture beam steering elements includes a second row of sub-aperture beam steering elements configured to steer the light beam in a second in-plane direction, an individual one of the sub-aperture beam steering elements in the second row of sub-aperture beam steering elements having a pitch such that an angle of the sub-aperture portion of the light beam refracted by the individual one of the sub-aperture beam steering elements corresponds to an angle of a diffractive order of the second row of sub-aperture beam steering elements.

23. The waveguide of claim 19, wherein the first beam steering portion provides discrete adjustment of the angle of the light beam in increments that are more coarse than an angular steering resolution provided by the second beam steering portion.

* * * * *